June 19, 1945.  N. F. WALLE, SR., ET AL  2,378,670
GUN FIRING INTERRUPTER
Filed April 9, 1941  2 Sheets-Sheet 1

INVENTORS
NORMAN F. WALLE SR.
HAMILTON M. MAYNARD AND
BY LAURENCE A. KEPLER
ATTORNEY

June 19, 1945.   N. F. WALLE, SR., ET AL   2,378,670
GUN FIRING INTERRUPTER
Filed April 9, 1941   2 Sheets-Sheet 2

INVENTORS
NORMAN F. WALLE SR.
HAMILTON M. MAYNARD AND
LAURENCE A. KEPLER
BY
ATTORNEY

Patented June 19, 1945

2,378,670

UNITED STATES PATENT OFFICE 2,378,670

GUN FIRING INTERRUPTER

Norman F. Walle, Sr., Buffalo, Hamilton M. Maynard, Snyder, and Lawrence A. Kepler, Buffalo, N. Y., assignors to Curtiss-Wright Corporation, a corporation of Delaware Application April 9, 1941, Serial No. 387,650

1 Claim. (Cl. 89—28)

This invention relates to aircraft armament and is particularly concerned with an accessory for a flexible machine gun mount by which firing of the machine gun will be prevented at such time as the gun may be aimed at a portion of the aircraft in which the gun is installed.

It is known that gun fire interrupters of this general character have been disclosed in the prior art but the present invention has for a particular object the provision of a unitary gun fire interrupter which is susceptible to installation in any type of aircraft where its need becomes apparent, the interrupter having but a single replaceable cam element or profiled pattern which is appropriate to the conformation of the particular airplane in which the device is installed. A further object of the invention is to provide a gun fire interrupter utilizing electrical switching means in circuit with the electrical trigger motor of a machine gun so that, when the interrupter is open circuited during periods when the gun is aimed at a part of the airplane, the trigger motor circuit is open to prevent firing of the gun. Still another object is to provide a gun fire interrupter assembly most of whose components are independent as to design characteristics from the particular gun installation with which it is adapted to be used. Still another object is to provide a gun fire interrupter assembly in which a profiled pattern or cam is used, which pattern or cam may be readily removed and replaced in the assembly, an associated object being to provide an interrupter assembly in which the proper layout for the pattern or cam may be readily established after a complete gun installation is made in an aircraft, thus allowing a minimum of restriction of the field of fire of the flexibly mounted gun.

Further objects of the invention will become apparent in reading the annexed detailed description in connection with the drawings, in which.

Figure 1:
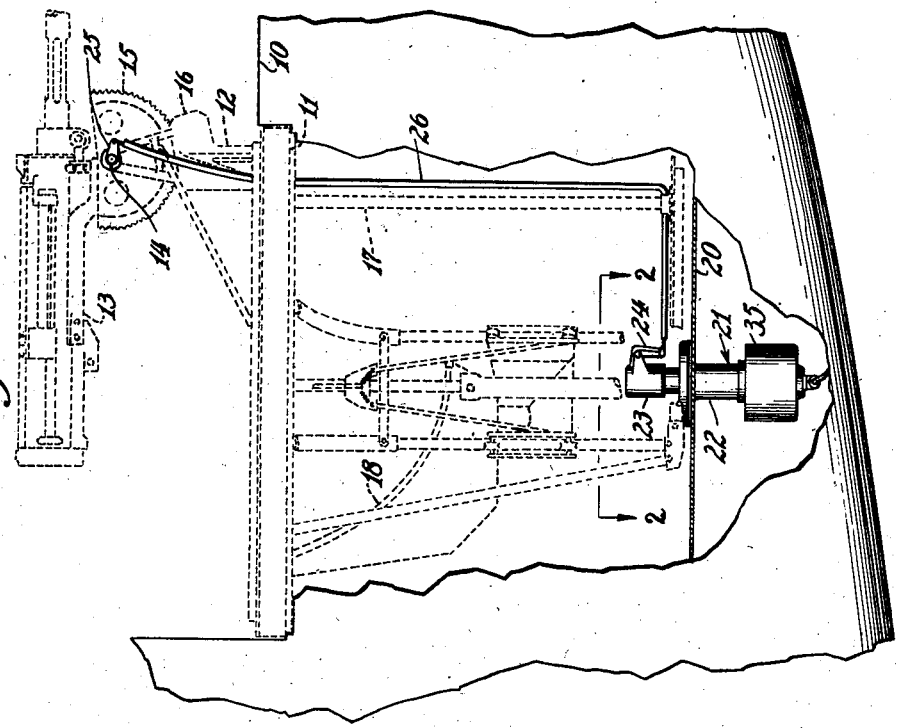
Fig. 1 is a side elevation of a portion of an aircraft body, partly broken away, to show a flexible gun mount and mechanism of this invention.
Figure 2:
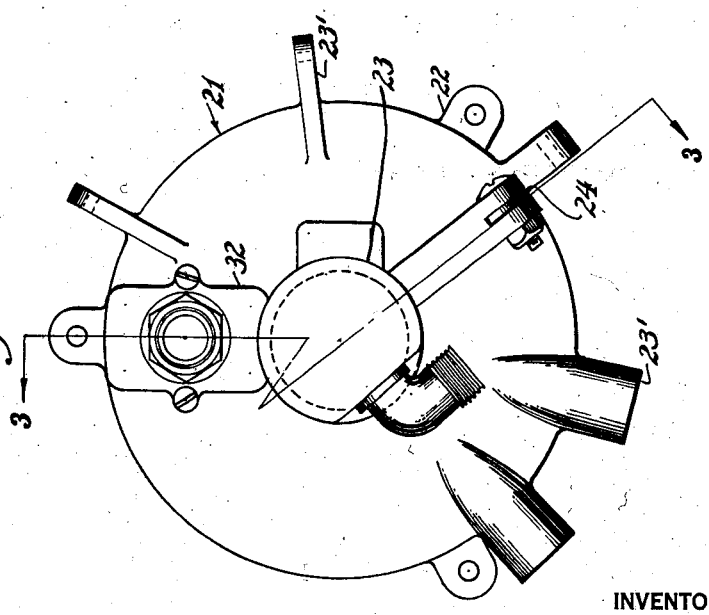
Fig. 2 is a plan on the line 2—2 of Fig. 1.

Referring first to Fig. 1, an aircraft body 10 is provided with a circular track 11 along which a carriage 12 is movable, the carriage supporting a machine gun 13 on trunions 14 about which the gun may be moved for elevation. To the gun is secured a gear segment 15 cooperating with a suitable pinion actuated by an elevating motor 16, the details of which are unimportant so far as this invention is concerned. The track 11 also supports a structure 17 to which a seat 18 is secured, the elements 17 and 18 being attached to the carriage 12 for traversing movement therewith. Preferably, traversing movement as well as elevating movement of the gun is accomplished by a suitable motor, not shown, and a control device is incorporated in the carriage 12 by which elevating and traversing motor movements are controlled. In other words, the gun mount is power operated as distinct from the three flexible guns common to the prior art whereby the gunner is relieved of the arduous task of laying the gun by hand, which operation becomes impractical in modern high speed aircraft.

Upon the floor 20 of the gunner's cockpit is mounted a gun fire interrupter unit 21 which includes a base member 22 and a rotor or carrier 23 provided with a bellcrank 24 connected to an arm 25 on the gun trunnion 14 through a Bowden cable 26. The bellcrank 24 is rotatable with the rotor 23 and the latter is constrained to rotation with the carriage and seat carrying structure 17 by suitable attachment thereto. Thus, traversing positions of the gun are coordinated with rotative positions of the element 23, and elevational positions of the gun control the position of the bellcrank 24.

Figure 3:
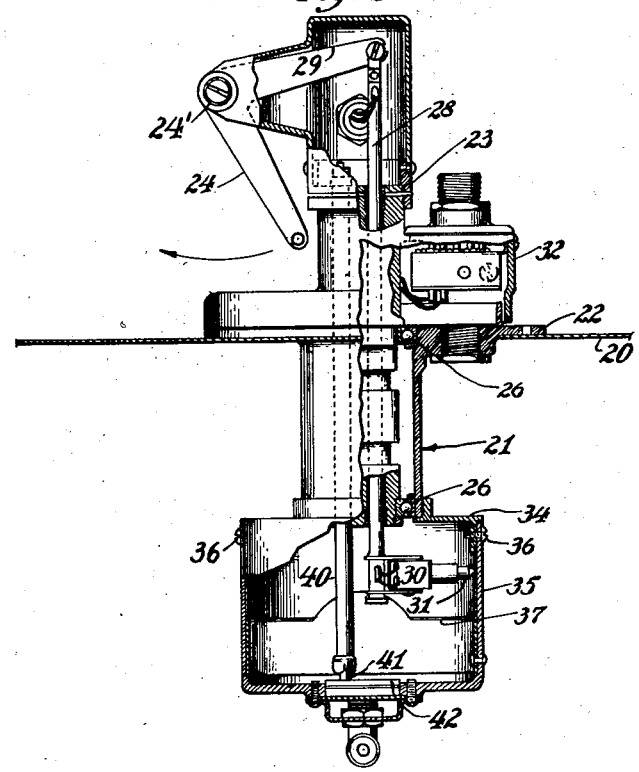
Fig. 3 is a partial section on the line 3—3 of Fig. 2.

Now referring to Fig. 3, the rotor 23 is borne in the base member 22 through spaced anti-friction bearings 26a, and said rotor is longitudinally drilled to receive a reciprocable plunger 28 which is clevised at its upper end to an arm 29 of the bellcrank 24 which is pivoted to the rotor 23. The plunger 28 projects below the bottom of the rotor 23 and carries a switch 30 provided with a radially projecting switch operating finger 31. The two wires from the switch 30 lead through the plunger 28, which is hollow, for connection within a junction box 32 forming part of the rotor. At the bottom of the base member 22 is a flange 34 to which a cylindrical receptacle 35 is detachably secured as by screws 36. The inside diameter of the receptacle 35 is of such order as to allow the finger 31 to move radially outwardly and to close the switch 30 but the elements 30 and 31 are so arranged that slight inward movement of the finger 31 will open the switch 30. To the inner wall of the receptacle 35 is secured sheet material or cam 37 of substantial thickness whose outline comprises a facsimile of the outline of protuberant portions of the aircraft as viewed along the axis of the gun bore. Accordingly, where the gun is aimed at a target which is wholly clear of the aircraft, the finger 31 sweeps over the inner surface of the receptacle 35, but when the gun is sighted so as to be in line with any portion of the airplane, the finger 31 is pressed inwardly by contact with the profiled sheet material 37 opening the switch 30 and preventing firing of the gun in a manner which will be described shortly. It is apparent that the assembly of Fig. 3 with the exception of the profiled sheet material 37, may be a standard article of manufacture, requiring no changes in design if it be installed in any one of a number of different types or styles of aircraft. When the device is installed in a new style of aircraft, it is merely necessary to install the profile sheet material 37 corresponding to that aircraft. The form of such a profile sheet may be easily established in a number of ways, one of which would be to substitute for the receptacle 35 a transparent plastic receptacle so that movement of the finger 31 may be observed and marked directly on the outside of the receptacle 35 as the gun is moved to aiming positions corresponding to the visible outline of aircraft protuberances. Thereafter, the transparent receptacle may be removed and used as a pattern from which an appropriate profile sheet material 37 may be constructed for installation in a standard receptacle 35 and assembly upon the interrupter 21.

Figure 4:
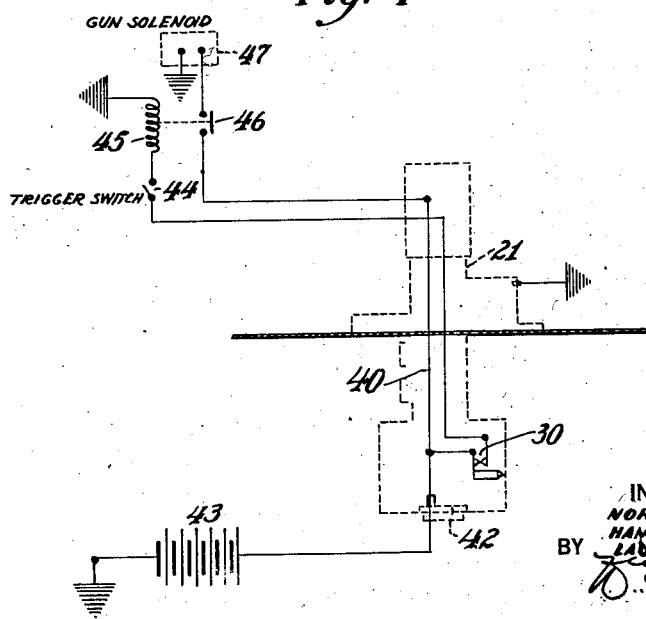
Fig. 4 is a wiring diagram of the interrupter system.

The rotor 23 is further provided with a contactor rod 40 which resiliently carries a brush 41 at its lower end engaging a contact plate 42 in the bottom of the receptacle 35. Referring to Fig. 4, this contact plate 42 is connected to a power supply 43 which in turn is grounded. The rod 40 connects with one point of the switch 30 while the other point of the switch 30 connects with a trigger switch 44 in series with the solenoid 45 of a trigger relay, the other end of the solenoid being grounded. The switch 46 of the trigger relay is in circuit with the gun operating solenoid 47 and is also connected with the power source 43 through the rod 40. Thus, energizing of the gun solenoid 47 is effected by closure of the relay switch 46 which in turn is controlled by energization of the relay solenoid 45 by closure of the trigger switch 44, so long as the switch 30 is closed. Since the closure of the switch 30 depends upon aiming of the gun in a free field of fire, gun operation is only permitted during aiming in such free field of fire while gun operation is wholly prevented while it is aimed at any portion of the airplane as determined by the profile of the sheet material 37.

It is obvious that rotation of the rotor 23 and reciprocation of the plunger 28 may be coordinated with the traversing and elevating movements of the gun by means other than those shown, and the scope of the invention is not to be restricted to the specific devices as shown in the drawings.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications and changes.

We claim as our invention:

Automatic circuit control mechanism for association with a gun mounted in an aircraft for swinging movements in horizontal and vertical planes an having an electrically controlled firing circuit, said mechanism including a carrier rotatably supported by a fixed part of said aircraft, an axially movable shaft mounted in said carrier and rotatable therewith, a bell crank pivotally mounted on said carrier and having one arm connected to said shaft, means connected to the other arm of said bell crank and movable with said gun for effecting rotating movements of said carrier corresponding to the horizontal movements of said gun and axial movements of said shaft corresponding to the vertical movements of said gun, a stationary housing into which said shaft extends, an enlarged portion of said housing having a cylindrical inner surface concentric with the axis of rotation of said carrier, a switch having both its terminals fixedly mounted on said shaft and adapted to be connected in said firing circuit, an actuating element for said switch movable radially of the axis of said carrier to open and close said switch, said actuating element being constructed and arranged to have a sweeping contact over a portion of said inner surface and to maintain said switch in closed position when in contact with said inner surface and to maintain said switch in open position when moved radially inward thereof whereby to interrupt said firing circuit, and a readily interchangeable insert providing a contoured inwardly projecting area over a portion of said inner surface to move said switch actuating element radially inward when in contact therewith whereby to open said switch, the contour of said insert being predetermined and located to contact said switch actuating element when the line of fire of said gun intersects a portion of said aircraft, the interchangeability of said insert with other inserts of different contour providing means for accommodating different types and styles of aircraft.

NORMAN F. WALLE, Sr.
HAMILTON M. MAYNARD.
LAWRENCE A. KEPLER.